(12) United States Patent
Hoebel

(10) Patent No.: US 12,161,909 B2
(45) Date of Patent: Dec. 10, 2024

(54) EXERCISING APPARATUS WITH A LIMB SUPPORT, AND METHOD FOR DETERMINING THE FORCE ACTING ON A LIMB SUPPORT OF AN EXERCISING APPARATUS

(71) Applicant: Medica Medizintechnik GmbH, Hochdorf (DE)

(72) Inventor: Otto Hoebel, Hochdorf (DE)

(73) Assignee: Medica Medizintechnik GmbH, Hochdorf (DE)

(*) Notice: Subject to any disclaimer, the term of this patent is extended or adjusted under 35 U.S.C. 154(b) by 650 days.

(21) Appl. No.: 17/370,773

(22) Filed: Jul. 8, 2021

(65) Prior Publication Data
US 2021/0331031 A1    Oct. 28, 2021

Related U.S. Application Data

(63) Continuation of application No. PCT/DE2020/100001, filed on Jan. 3, 2020.

(30) Foreign Application Priority Data

Jan. 8, 2019 (DE) ................ 10 2019 100 291.5

(51) Int. Cl.
*A63B 22/06* (2006.01)

(52) U.S. Cl.
CPC ... *A63B 22/0605* (2013.01); *A63B 2022/0611* (2013.01); *A63B 2220/36* (2013.01);
(Continued)

(58) Field of Classification Search
CPC ........ A63B 22/0605; A63B 2022/0611; A63B 2022/0623; A63B 2213/00; A63B 2209/08; A61H 1/0214
See application file for complete search history.

(56) References Cited

U.S. PATENT DOCUMENTS 8,584,529 B2    11/2013  Fisher et al.
2005/0020411 A1*  1/2005  Andrews ............... B62M 3/02
                                                    482/57
(Continued)

FOREIGN PATENT DOCUMENTS

AU    2013249210 B2 *  6/2016  ......... A63B 22/0605
DE        29508072 U1      8/1995
(Continued)

OTHER PUBLICATIONS

International Search Report dated May 11, 2020 in corresponding application PCT/DE2020/100001.

*Primary Examiner* — Joshua T Kennedy
(74) *Attorney, Agent, or Firm* — Muncy, Geissler, Olds & Lowe, P.C.

(57) ABSTRACT

An exercising apparatus for exercising at least one limb, having a supporting frame and at least one crank which is arranged on a rotation shaft assigned to the supporting frame, and having at least one limb support which can be fastened to the at least one crank at different radial distances from the rotation shaft. A detector is provided for detecting the radial distance of the at least one limb support from the rotation shaft. The invention further relates to a limb support and to a method for determining the force acting on a limb support of an exercising apparatus.

7 Claims, 4 Drawing Sheets

(52) U.S. Cl.
CPC ..... *A63B 2220/58* (2013.01); *A63B 2220/805* (2013.01); *A63B 2220/833* (2013.01)

(56) References Cited

U.S. PATENT DOCUMENTS

| | | |
|---|---|---|
| 2006/0094569 A1 | 5/2006 | Day |
| 2009/0211395 A1 | 8/2009 | Mul'e |
| 2010/0173747 A1 | 7/2010 | Chen et al. |
| 2018/0085626 A1* | 3/2018 | Sheu ................ B62J 45/421 |

FOREIGN PATENT DOCUMENTS

| | | | |
|---|---|---|---|
| DE | 102005027181 A1 | 12/2006 | |
| DE | 102011055200 A1 | 5/2013 | |
| WO | WO-2008013544 A1 * | 1/2008 | ....... A63B 21/00069 |
| WO | WO2009006673 A1 | 1/2009 | |

* cited by examiner

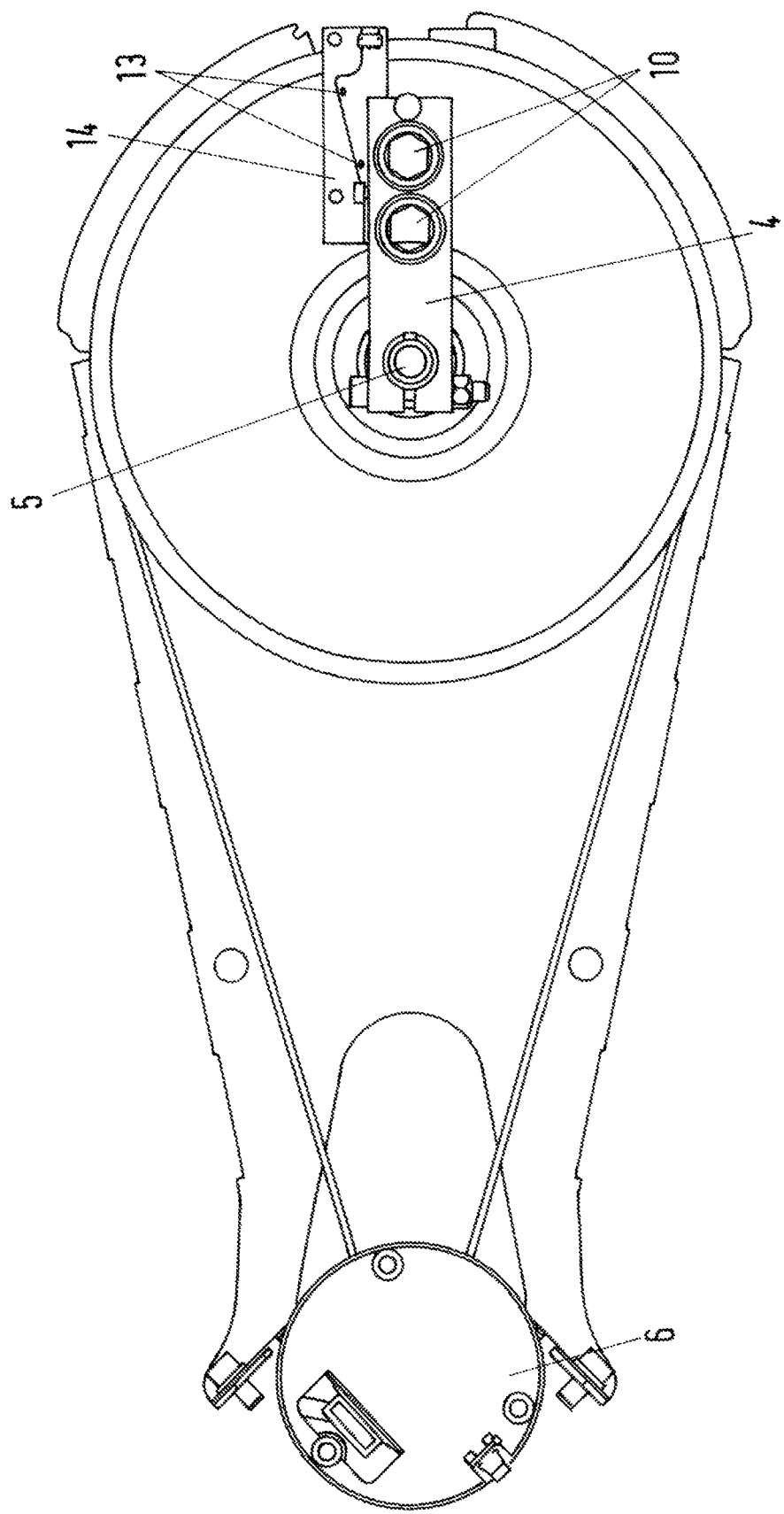

ic cells as part of light barriers.
EXERCISING APPARATUS WITH A LIMB SUPPORT, AND METHOD FOR DETERMINING THE FORCE ACTING ON A LIMB SUPPORT OF AN EXERCISING APPARATUS This nonprovisional application is a continuation of International Application No. PCT/DE2020/100001, which was filed on Jan. 3, 2020 and which claims priority to German Patent Application No. 10 2019 100 291.5, which was filed in Germany on Jan. 8, 2019 and which are both herein incorporated by reference.

BACKGROUND OF THE INVENTION

Field of the Invention

The present invention relates to an exercising apparatus for exercising at least one limb, having a supporting frame and at least one crank which is arranged on a rotation shaft assigned to the supporting frame, and having at least one limb support which can be fastened to the at least one crank at different radial distances from the rotation shaft. The invention further relates to a limb support and to a method for determining the force acting on a limb support of an exercising apparatus.

Description of the Background Art

Exercising apparatus of the aforementioned kind are known, for example, from DE 10 2011 055 200 B3, which are particularly suitable for the targeted exercising of individual limb muscle groups, as is necessary in the rehabilitation of patients. Such exercising apparatus are also used in the leisure sector as sports equipment, for example, as ergometers, or for the targeted exercising of top athletes. It should be noted that, particularly when rehabilitating patients, precise control of the loads is required, in particular the force acting on the limb support. As an example, the use of an artificial hip can be cited with the specification of the treating physician that during rehabilitation the load on the limb with the artificial hip should not exceed a predefined value, for example, 20 kg with the corresponding force. Because the available exercising apparatus can be individually adapted to the different users in the rehabilitation sector by changing the radial distance of the limb support from the rotation shaft, this means that the load cannot be clearly deduced from the acting torque, due to the simple relationship of torque equal to force×lever arm. Alternatively, there is also the possibility that the exercising apparatus is provided with a motor which provides a certain torque on the rotation shaft for passive exercising, but again due to the aforementioned dependency on this torque, without knowledge of the radial distance it is not possible to clearly deduce the force acting on the patient, so that the success of the rehabilitation is at risk or the patient's health can even be harmed. To avoid these disadvantages, it is known to assign sensors for detecting the acting force, namely strain gauge sensors, to the limb support, for example, a footrest for a leg. This has the disadvantage, however, that it leads to a significant increase in the cost of the exercising apparatus and thus to a burden on the budget required for rehabilitation.

SUMMARY OF THE INVENTION

It is therefore an object of the present invention to provide an exercising apparatus such that control of a force acting on the user of the exercising apparatus is possible in a simple, cost-effective manner.

A further object of the invention is to provide an improved limb support and an improved method for determining the force acting on a limb support of an exercising apparatus.

This object related to the exercising apparatus is achieved by an exercising apparatus in that a detector for detecting the radial distance between the at least one limb support and rotation shaft is provided.

The invention is based on the knowledge that it is not only possible to measure the force on the limb support directly, but that the force can also be determined as a derived variable if, in addition to the acting torque, the radial distance between the limb support and the rotation shaft is known. Therefore, according to the invention, a detector is provided for detecting the radial distance of the limb support from the rotation shaft, with the knowledge of which the acting force can then be determined in conjunction with the torque generated by the patient or the torque exerted on the patient. In healthy athletes it can be assumed that there is a symmetrical force development in the right and left limbs, wherein this assumption is not always justified in the rehabilitation sector, so that a suitable detector is advantageously assigned to each limb support.

It is preferred further if the detector is designed for the automated detection of the radial distance of the limb support from the rotation shaft, and that the radial distance detected by the detector can be fed as a measured value to an evaluation unit to calculate the force exerted on the limb support. With the evaluation provided by the evaluation unit, it is possible to control targeted exercising and, in particular, if necessary, to act on the motor to reduce the drive torque generated or, in the sense of biofeedback, to signal to the patient that the force generated has been exceeded. The evaluation unit can also be supplemented by a display unit with which the calculated force is displayed as a numerical value, so that the information for the patient or the physiotherapist caring for him is not limited to reaching or falling below a threshold value.

It is very particularly preferred if the detector is formed by at least one sensor selected from a group comprising Hall sensors, ultrasonic sensors, laser sensors, and/or photoelectric cells as part of light barriers.

An exercising apparatus having a sensor formed by the Hall sensor is characterized in that the Hall sensor is positioned on a circuit board disposed stationary relative to the rotation shaft, and in that receptacles and/or an elongated hole, in which the limb supports can be inserted with a pin having a magnet, are formed in the crank that moves past the circuit board. This results in the advantage that the selected crank radius can be determined when the crank moves past, therefore, the distance between the limb supports and the rotation shaft. The Hall sensor can also detect whether a magnetic north pole or a magnetic south pole moves past, so that the pin expediently has a bar magnet with a north-south pole alignment coaxial with the pin axis. As a result, the limb supports that can be inserted into the receptacles or the elongated hole can be divided into two clearly distinguishable groups, for example, for leg exercise and arm exercise, the magnetic north pole is arranged on the side facing the crank for leg exercise and the magnetic south pole faces the crank for arm exercise; therefore, the bar magnet is rotated by 180°.

It is preferred further that a plurality of Hall sensors are arranged on the circuit board, which offers particular advantages if there are no discretely spaced receptacles but an elongated hole or a corresponding slot is used, because by evaluating the signals the position of the limb support in the elongated hole can be calculated continuously by using multiple sensors.

A further advantage arises when the Hall sensors arranged on the circuit board are arranged on a straight line that does not pass through the rotation shaft; therefore, the straight line defined by the Hall sensors is not in a strictly radial orientation, but there is an inclination with respect to the radial orientation, because the crank position with respect to the circuit board is thus always the same when the magnet moves past and thus the circuit board can also function as a position reference sensor.

The part of the object related to the limb support is achieved by a limb support in which there is a pin which has a bar magnet with a north-south pole alignment coaxial with the pin receptacle. Because with such a limb support, during its use in exercising, not only the moving past of the magnet can be detected but its alignment as well, there is the further possibility that the orientation of the pole alignment can be used to identify the affiliation with an accessory group.

The part of the object relating to the method is achieved by a method for determining the force acting on a limb support of an exercising apparatus, comprising the steps of positioning the limb support on a crank at a radial distance from its rotation shaft, and detecting the radial distance via at least one sensor, and evaluating in an evaluation unit the measured value detected by the sensor in conjunction with a torque acting on the rotation shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is a side view of the object from FIG. 2, shown without the limb support.

DETAILED DESCRIPTION

Figure 1:
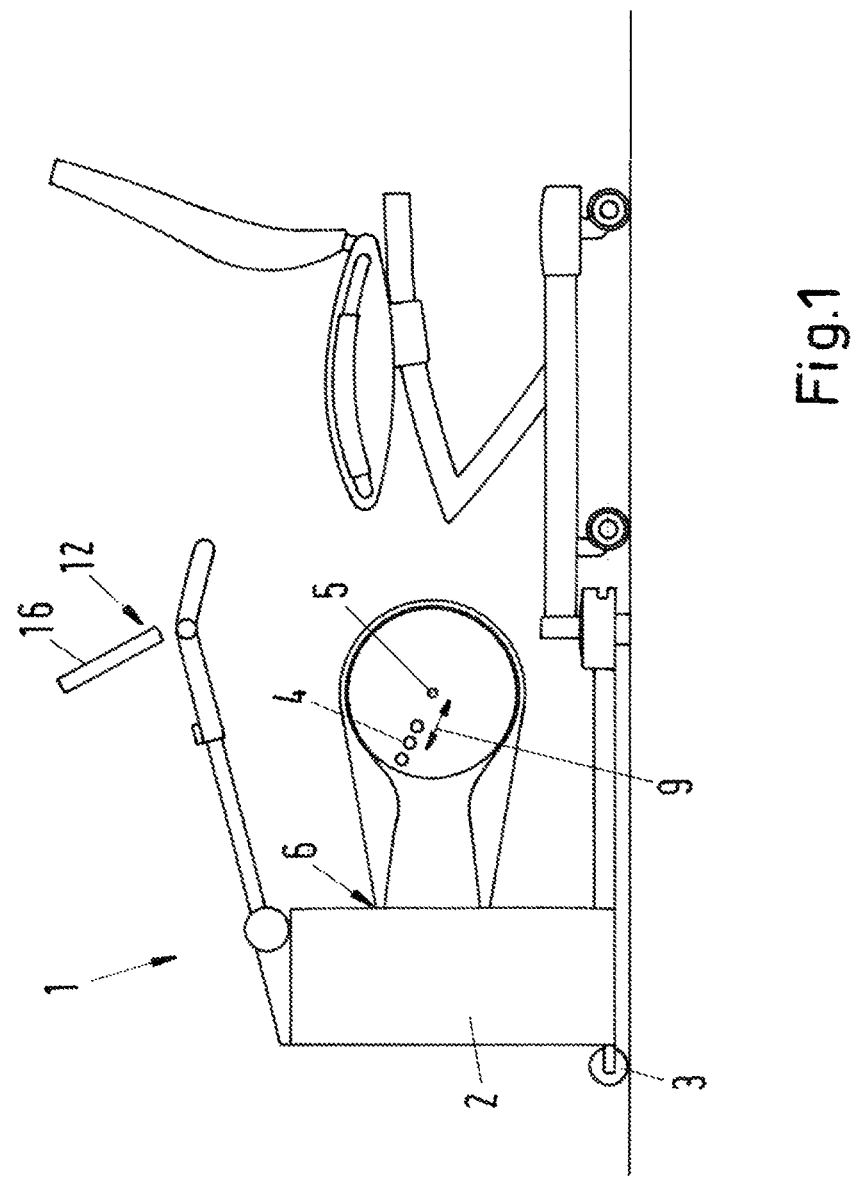
FIG. 1 is a schematic representation of an exercising apparatus in a side view.

An exercising apparatus 1 is shown in FIG. 1, which is suitable for exercising a pair of limbs, namely two legs, this exemplary embodiment only serving to explain the invention which can also be used for exercising the other pair of limbs, namely the arms. Exercising apparatus 1 has a supporting frame 2 which, in the exemplary embodiment shown, is arranged on rollers 3, preferably having braking capability. The exemplary embodiment has two cranks 4 which are arranged on a rotation shaft 5 assigned to supporting frame 2. Furthermore, exercising apparatus 1 has a motor 6 for driving rotation shaft 5; it also has two limb supports 7, namely two footrests 8, which can be fastened at different radial distances 9 from rotation shaft 5 of the respectively assigned crank 4, namely in that in the exemplary embodiment shown two receptacles 10 are formed in each crank 4, said receptacles into which a pin 11 assigned to footrest 8 can be inserted.

A detector, designed for automated detection, is provided for detecting the radial distance 9 of the limb support from the rotation shaft, wherein radial distance 9 detected by the detector can be fed as a measured value to an evaluation unit 12 to calculate the force exerted on limb support 7 using the formula force=torque divided by the lever arm, wherein the lever arm is given by radial distance 9 of limb support 7 from rotation shaft 5. The torque in this case is generated by motor 6 and is known or it is applied by the patient, so that on the basis of the detected torque and knowledge of radial distance 9 the force derived therefrom can be controlled as to whether the exercising of the patient is effective and thereby avoids an overload.

Ultrasonic sensors, laser sensors, and photoelectric cells as part of light barriers are suitable for detecting the radial distance. In the exemplary embodiment shown, the use of Hall sensors 13 is shown, namely two Hall sensors which are positioned on a circuit board 14 disposed stationary to rotation shaft 5, wherein in crank 4, which moves past circuit board 14, comprises receptacles 10 in which limb supports 7 with pin 11 having a magnet 15 can be inserted. Receptacles 10 can also be combined to form an elongated hole; there can also be more than two receptacles 10 in crank 4. Pin 11 has a bar magnet with a north-south pole alignment coaxial with the pin axis, so that it is possible to differentiate between two groups of accessories, for example, for leg exercising and for arm exercising, which are characterized by the alignment of the bar magnet.

Figure 2:
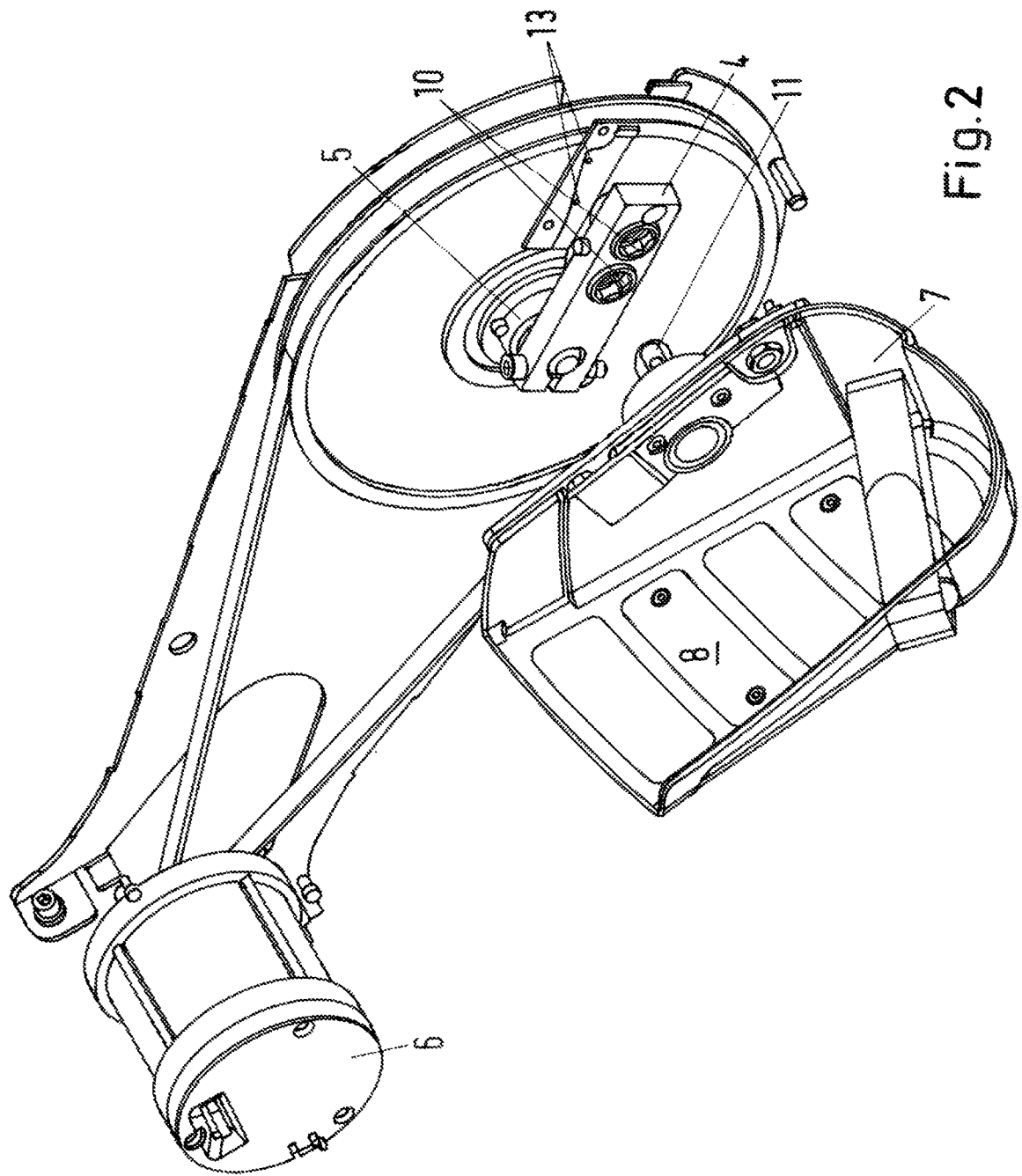
FIG. 2 shows an enlarged illustration of the part of the exercising apparatus, necessary to explain the invention, in a perspective illustration.
Figure 3:
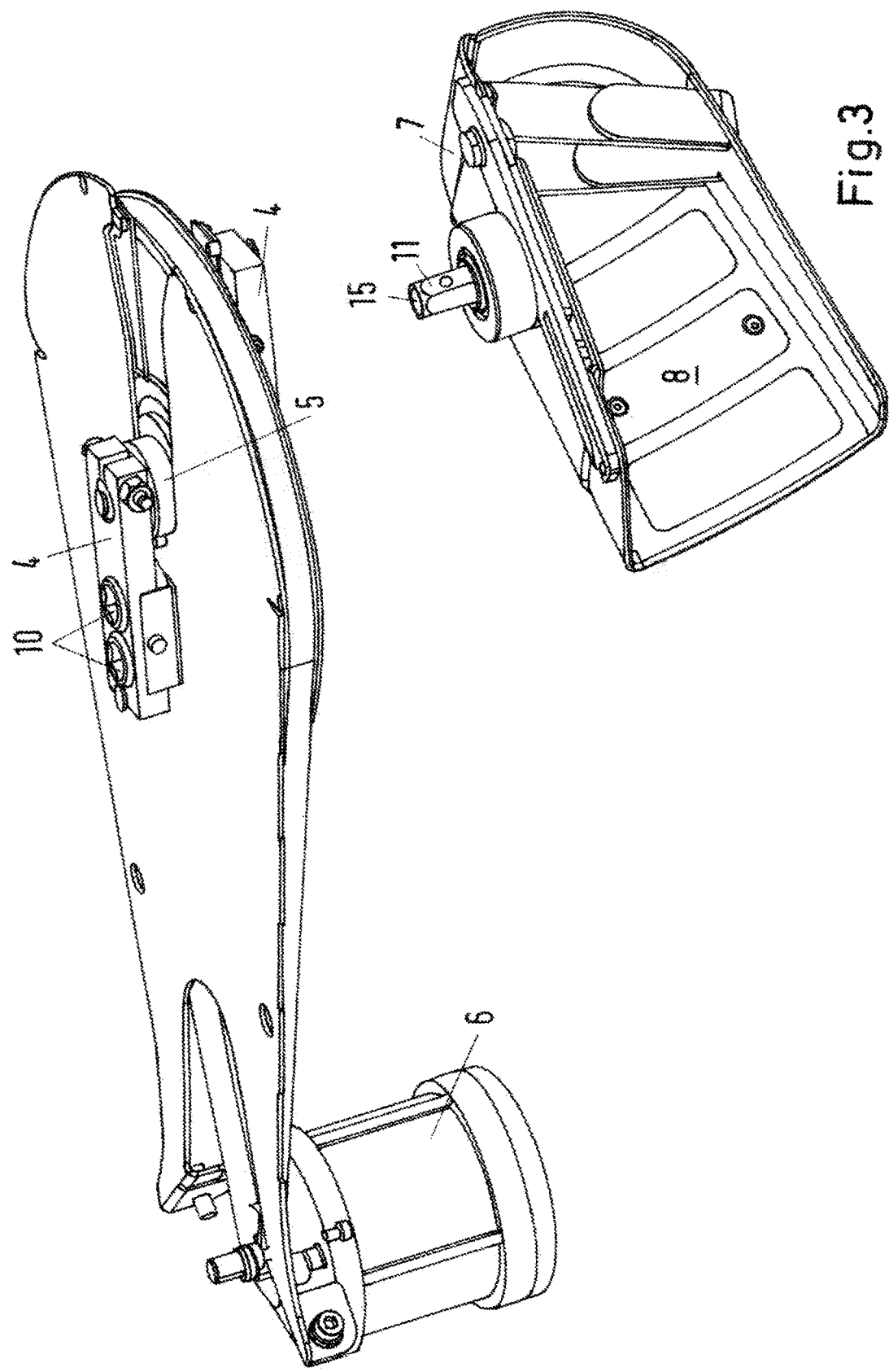
FIG. 3 shows a perspective illustration from a different viewing angle compared to FIG. 2.

It can be seen in particular from FIGS. 2 and 4 that a plurality Hall sensors 13 are arranged on circuit board 14, by which a straight line is defined that does not run through rotation shaft 5, therefore, encloses an angle with a radial orientation so that the crank position is always the same relative to the usable sensor when magnet 15 moves past.

The use of exercising apparatus 1 and the method required therefor for determining the force acting on a limb support 7 are explained below. Limb support 7 and, therefore, footrest 8 shown in FIG. 2, is first positioned at a radial distance 9 from rotation shaft 5 by inserting pin 11 with magnet 15 into one of the two receptacles 10 shown. By aligning the bar magnet with the magnetic north pole, for example, facing receptacle 10 of the crank, limb support 7 can be identified as a footrest 8 to distinguish it, for example, from a support for arm exercising in which the magnetic south pole faces receptacle 10.

With the two Hall sensors 13 arranged on circuit board 14, radial distance 9 of footrest 8 from rotation shaft 5 can be determined in order to determine, in an evaluation unit 12, in conjunction with the torque acting on rotation shaft 5, the force which is output optionally as a numerical value in a display unit 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exercising apparatus for exercising at least one limb, the exercising apparatus comprising:

a supporting frame;

at least one crank arranged on a rotation shaft assigned to the supporting frame;

at least one limb support adapted to be fastened to the at least one crank, wherein the at least one limb support is configured to be fastened at varying radial distances from the rotation shaft;

a detector to detect the radial distance of the at least one limb support from the rotation shaft, the detector comprising a Hall sensor positioned on a circuit board disposed stationary to the rotation shaft; and a plurality of receptacles and/or an elongated hole, in which the limb support with a pin having a magnet is adapted to be inserted, is formed in the crank, wherein the crank moves past the circuit board.

2. The exercising apparatus according to claim 1, wherein the detector is enabled for the automated detection of the radial distance of the limb support from the rotation shaft, and wherein the radial distance detected by the detector is used as a measured value to calculate a force exerted on the limb support.

3. The exercising apparatus according to claim 1, wherein the magnet is a bar magnet with a north-south pole alignment coaxial with an axis of the pin.

4. The exercising apparatus according to claim 1, wherein the Hall sensor is one of a plurality of Hall sensors arranged on the circuit board.

5. The exercising apparatus according to claim 4, wherein the plurality of Hall sensors arranged on the circuit board is arranged in a straight line that does not pass through the rotation shaft.

6. A method for determining a force acting on a limb support of an exercising apparatus, the method comprising:

positioning the limb support on a crank at a radial distance from a rotation shaft of the crank;

detecting the radial distance via a Hall sensor positioned on a circuit board disposed stationary to the rotation shaft; and evaluating a measured value detected by the sensor in conjunction with a torque acting on the rotation shaft, wherein a plurality of receptacles and/or an elongated hole, in which the limb support with a pin having a magnet is adapted to be inserted, is formed in the crank, and wherein the crank moves past the circuit board.

7. An exercising apparatus for exercising at least one limb, the exercising apparatus comprising:

a supporting frame;

a crank arranged on a rotation shaft assigned to the supporting frame;

a limb support adapted to be fastened to the crank at varying radial distances from the rotation shaft;

a detector to detect the radial distance of the limb support from the rotation shaft; and a pin having a bar magnet with a north-south pole alignment coaxial with an axis of the pin.

* * * * *